US007021777B2

(12) United States Patent
Amitai

(10) Patent No.: US 7,021,777 B2
(45) Date of Patent: Apr. 4, 2006

(54) OPTICAL DEVICES PARTICULARLY FOR REMOTE VIEWING APPLICATIONS

(75) Inventor: Yaakov Amitai, Rehovot (IL)

(73) Assignee: Lumus Ltd., Rehovot (IL)

( * ) Notice: Subject to any disclaimer, the term of this patent is extended or adjusted under 35 U.S.C. 154(b) by 0 days.

(21) Appl. No.: 10/937,185

(22) Filed: Sep. 9, 2004

(65) Prior Publication Data

US 2005/0078388 A1 Apr. 14, 2005

(30) Foreign Application Priority Data

Sep. 10, 2003 (IL) .................................... 157836

(51) Int. Cl.
*G02B 5/08* (2006.01)

(52) U.S. Cl. ...................................... 359/857; 359/402

(58) Field of Classification Search ................ 359/402, 359/838, 850, 857, 861
See application file for complete search history.

(56) References Cited

U.S. PATENT DOCUMENTS 4,613,216 A 9/1986 Herbec et al.
5,301,067 A * 4/1994 Bleier et al. ................ 359/857
2003/0165017 A1 9/2003 Amitai

FOREIGN PATENT DOCUMENTS

| | | |
|---|---|---|
| DE | 1 422 172 | 11/1970 |
| FR | 2 496 905 | 6/1982 |
| GB | 2 220 081 | 12/1989 |

* cited by examiner

*Primary Examiner*—Euncha P. Cherry

(57) ABSTRACT

There is provided an optical device for transferring light within a given field-of-view, comprising an input aperture; reflecting surfaces, and an output aperture located in spaced-apart relationship from the input aperture such that light waves, located within the field-of-view, that enter the optical device through the input aperture, exit the optical device through the output aperture, wherein the reflecting surfaces are at least one pair of parallel reflecting surfaces and that part of the light waves located within the field-of-view that enter the input aperture, pass directly to the output aperture without being reflected off the at least one pair of parallel reflecting surfaces, while another part of the light waves within the field-of-view that enters the input aperture, arrives at the output aperture after being twice reflected by the at least one pair of parallel reflecting surfaces.

16 Claims, 3 Drawing Sheets

OPTICAL DEVICES PARTICULARLY FOR REMOTE VIEWING APPLICATIONS

FIELD OF THE INVENTION

The present invention relates to optical devices, and in particular to devices whereby an object is viewed remotely, with a large field-of-view (FOV) and in which the system aperture is limited by various constrains.

The invention can advantageously be implemented in a large number of imaging applications, such as periscopes, as well as head-mounted and head-up displays.

BACKGROUND OF THE INVENTION

There are many applications in which remote viewing is necessary, as the object to be viewed is located in an environment hostile to the viewer, or it is inaccessible to the viewer without causing unacceptable damage to its environment. Periscopes for military applications fall into the former category, while endoscopes, colonoscopes, laryngoscopes and otoscopes, for medical applications, fall into the latter. An additional category is that of see-through imaging systems, such us head-mounted displays (HMDs) and head-up displays (HUDs), wherein the optical combiner is located in front of the eye of the viewer, while the display source is located remotely so as to avoid the blocking of the external view. For each of these applications, instrumentation is needed to collect light from the object, to transport the light to a location more favorable for viewing, and to dispense the light to the viewing instruments or to the eye of the viewer. There are some image transportation techniques in common use today. One possible transportation method is to sense the image with a camera and transport the data electronically into a display source that projects the image. Unfortunately, in addition to the relatively high cost of the electronic system, the resolution of both the camera and the display source is usually inferior compared to the resolution of the eye. Another method is to transport the light pattern with a coherent fiber optics bundle. This method is, however, adequate for systems with very small apertures only. Furthermore, the resolution of a fiber optics bundle is even more inferior than that of the electronic imaging system mentioned above. An alternative method is to transport the light pattern with a relay lens or a train of relay lenses. While the last mentioned method is the most commonly used for many applications, and can usually supply the user with a sharp and bright image, it still suffers from some drawbacks. Primarily, the optical module becomes complicated and expensive, especially for optical systems, which require high performance.

DISCLOSURE OF THE INVENTION

The present invention facilitates the structure and fabrication of very simple and high-performance optical modules for, amongst other applications, periscopes. The invention allows systems to achieve a relatively high FOV while maintaining a compact and simple module. The optical system offered by the present invention is particularly advantageous because it can be readily incorporated even into optical systems having specialized configurations.

The invention also enables the construction of improved HUDs in aircrafts, as well as ground vehicles, where they can potentially assist the pilot or driver in navigation and driving tasks. State-of-the-art HUDs, nevertheless, suffer from several significant drawbacks. Since the system stop, which is usually located at the external surface of the collimating lens, is positioned far from the viewer's eyes, the instantaneous field-of-view (IFOV) is significantly reduced. Hence, in order to obtain a more desirable IFOV, a very large collimating lens is required, otherwise a much smaller IFOV will be obtained. As a result, the present HUD systems are either bulky and large, requiring considerable installation space which is inconvenient, and at times, even unsafe, or suffer from limited performance.

An important application of the present invention relates to its implementation in a compact HUD, which alleviates the aforementioned drawbacks. In the HUD design of the current invention, the total volume of the system is significantly reduced while retaining the achievable IFOV. Hence, the overall system is very compact and can readily be installed in a variety of configurations for a wide range of applications.

A further application of the present invention provides a compact display with a wide FOV for HMDs, whereby an optical module serves both as an imaging lens and a combiner and a two-dimensional display is imaged to infinity and reflected into the eye of an observer. The display can be obtained directly, either from a cathode ray tube (CRT) or a liquid crystal display (LCD), or indirectly, by means of a relay lens or an optical fiber bundle. Typically, the display is comprised of an array of points, imaged to infinity by a collimating lens and transmitted into the eye of a viewer by means of a partially reflecting surface acting as a combiner. Usually, a conventional, free-space optical module is used for these purposes. Unfortunately, as the desired FOV of the system is increased, however, the optical module becomes heavier, bulkier and very complicated to use. This is a major drawback in head-mounted applications wherein the system should be as light and compact as possible.

There are other drawbacks of the existing systems. The overall optical systems are usually very complicated and difficult to manufacture with these designs. Furthermore, the eye-motion-box of the optical viewing angles resulting from these designs, is usually very small—typically less than 8 mm. Hence, the performance of the optical system is very sensitive even to small movements of the visor relative to the eye of the viewer.

The present invention facilitates the structure and fabrication of very compact HMDs. The invention allows relatively wide FOVs together with relatively large eye-motion-box values. The resulting optical system offers a large, high-quality image, which also accommodates large movements of the eye.

For all of the possible applications, the present invention is particularly advantageous for substrate-mode configurations, i.e., for a configuration comprising a light-transmitting substrate having at least two major surfaces and edges, optical means for coupling light from the imaging module into the substrate by total internal reflection, and at least one partially reflecting surface located in the substrate for coupling the light onto the viewer's eye. The combination of the present invention with a substrate-mode configuration can yield a very compact and convenient optical system along with a large IFOV and large eye-motion-box.

A broad object of the present invention, therefore, is to alleviate the drawbacks of state-of-the-art optical devices and, in particular, remote viewing display devices, and to provide optical devices and systems with improved performance.

The invention therefore provides an optical device for transferring light within a given field-of-view, comprising an input aperture; reflecting surfaces, and an output aperture located in spaced-apart relationship from said input aperture such that light waves, located within the said field-of-view, that enter the optical device through said input aperture, exit the optical device through said output aperture, and characterized in that said reflecting surfaces are at least one pair of parallel reflecting surfaces and that part of said light waves located within said field-of-view that enter the input aperture, pass directly in free space to the output aperture without being reflected, while another part of the light waves within said field-of-view that enters the input aperture, arrives at the output aperture after being twice reflected by said at least one pair of parallel reflecting surfaces.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The descriptions taken with the drawings are to serve as direction to those skilled in the art as to how the several forms of the invention may be embodied in practice.

In the drawings:

FIG. 1 is a side view of the simplest form of a prior art periscope structure;

FIG. 2 is a schematic diagram illustrating an unfolded optical layout of a prior art periscope structure;

FIG. 3 is a side view of a prior art substrate mode folding optical device for HUD and HMD;

FIG. 4 is a schematic diagram illustrating an optical layout according to the present invention, utilizing two pairs of parallel reflecting mirrors for achieving a wide FOV;

FIG. 5 is a diagram illustrating a substrate mode folding optical device for HUD and HMD, according to the present invention, and FIGS. 6A and 6B illustrate side and top view of an optical device in accordance with the present invention, showing the light waves as coupled into a substrate-mode element.

DETAILED DESCRIPTION OF PREFERRED EMBODIMENTS

Remote viewing optical systems, and periscopes in particular, are optical systems designed to displace the object space reference point away from the eye space reference point. This allows the observer to look over or around an intervening obstacle, or to view objects in a dangerous location or environment while the observer is in a safer location or environment. A submarine periscope is the typical example, but many other applications, both military and non-military, are envisioned.

Figure 1:
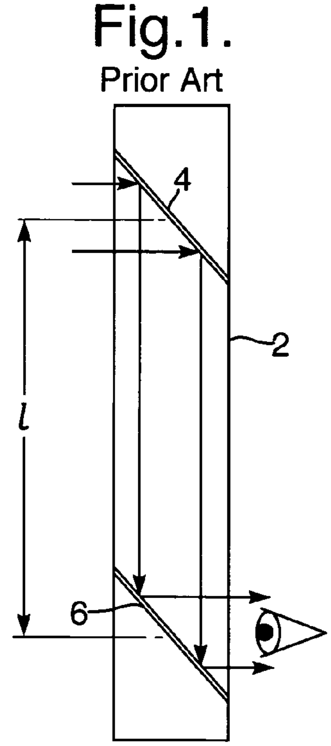

FIG. 1 illustrates the simplest form of a prior art periscope 2, having a pair of optical elements 4 and 6, e.g., a pair of folding mirrors, which are used to allow a viewer to see over a nearby obstacle. The basic geometry of this embodiment imposes limitations on the performance of the system. This is especially true for systems with a very wide FOV and a constraint on the distance, l, between the folding-in optical element 4 and the folding-out element 6.

Figure 2:
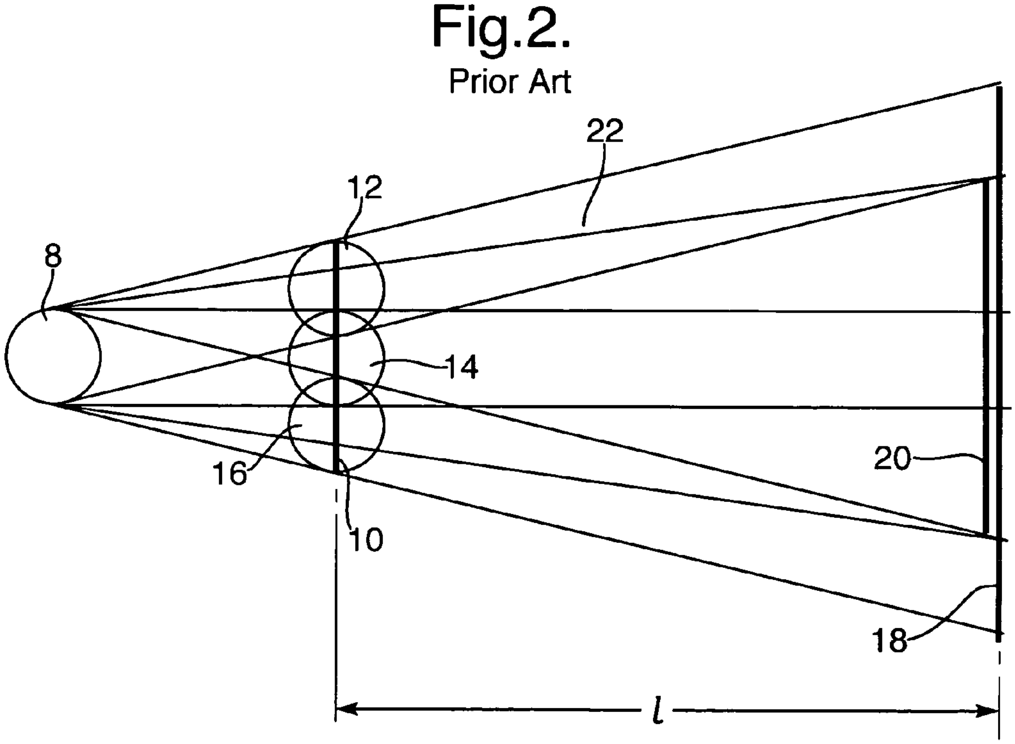

FIG. 2 illustrates an unfolded optical system with the following parameters: l=400 mm, $R_{eye}$, the distance between the eye of a viewer, or better yet, the eye-motion-box (EMB) 8 and the output aperture 10 is 60 mm, the required EMB 8 is 50 mm and the required vertical FOV is 42°. When the rays from the EMB 8 are traced, it can be seen that the light passes through the projection of the EMB on the output aperture 10, where 12, 14 and 16 are the projections of the upper, central and lower angles respectively, of the FOV. This means that to achieve the desired FOV, the required input aperture 18 must be 325 mm. This is a relatively large aperture that necessarily increases the size of the entire system. If, however, only a smaller input aperture 20 of 200 mm is used, the obtainable vertical FOV 22 decrease to 23°, which is nearly half of the required FOV.

The most common method to achieve both a small aperture and a wide FOV, is to transmit the light pattern from the folding-in aperture into the folding-out aperture via a relay lens, or a train of relay lenses, usually having a unity of magnification. While this method is used for many applications and can usually provide the user with a sharp and bright image, it still suffers from some drawbacks, especially for systems where high performance is required. Firstly, it is desirable to minimize the number of relay stages in the relay train, both to maximize transmittance and to minimize the field curvature caused by the large number of positive lenses. Secondly, the outside diameter of the relay train is typically restricted, which can impose some severe restrictions on the optical design of the system. Thirdly, economic considerations make it desirable to minimize the total number of optical elements. Fourthly, it is desirable to keep internal images well clear of optical surfaces, where dust and scratches can obscure portions of the image, which complicates the mechanical design and the fabrication of the device. Fifthly, the number of relay stages must be either odd or even to insure the desired output image orientation, which adds to the complexity of the optical design. All in all, the existing systems are either heavy, cumbersome and expensive, or they have poor performance. Hence, a compromise between good performance on one hand, and compactness and cost, on the other, must usually be found when designing a remote sensing system.

Figure 3:
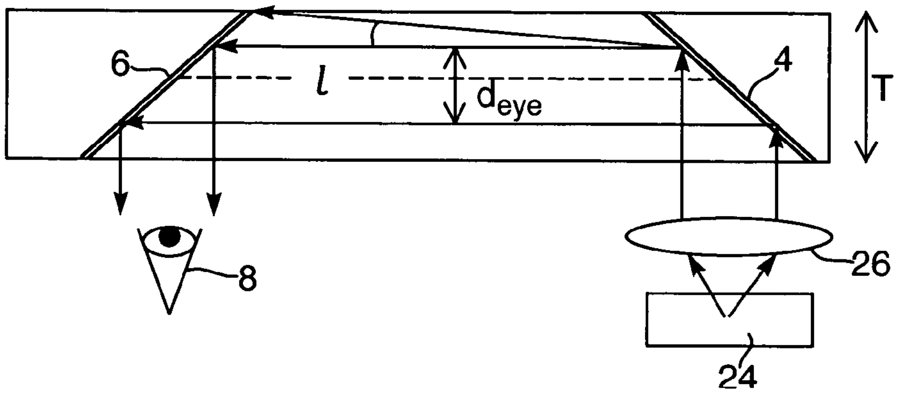

FIG. 3 schematically illustrates a conventional folding optics arrangement, for both HUDs and HMDs wherein the optical system 2 is illuminated by a display source 24. The display is collimated by a collimating lens 26. The light from the display source 24 is folded by a first reflecting optical element 4, while a second reflecting optical element 6 folds the light out into the EMB 8 of a viewer. Despite the compactness of this configuration, it suffers significant drawbacks, specifically, a limited FOV. As seen in the Figure, the maximum allowed off-axis angle α inside the substrate is:

$$\alpha_{\max} = \arctan\left(\frac{T - d_{eye}}{2l}\right), \tag{1}$$

wherein T is the substrate thickness;

$d_{eye}$, is the desired exit-pupil diameter, and l, is the distance between reflecting elements 4 and 6.

This schematic configuration is true for both HUDs and HMDs and only the scale is different, i.e., distances for HUDs are in the order of few hundreds of millimeters, whereas the distances for HMDs are in the order of a few tens of millimeters. The constraint that the combiner should be located in front of the viewer's eyes while the display source and the collimating lens should be located further away to avoid blocking of the external scene, however, exists in both cases.

Figure 4:
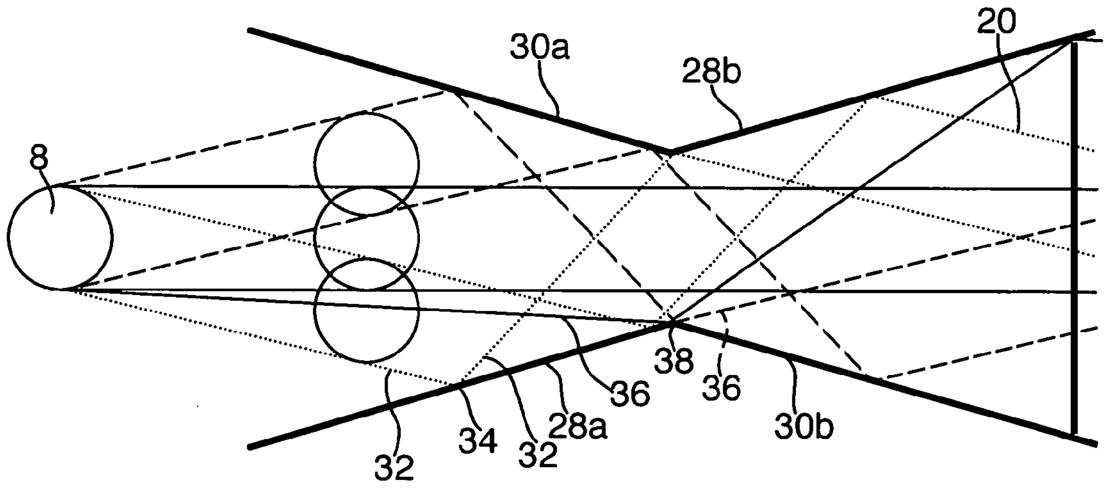

FIG. 4 illustrates a solution to this problem according to the present invention. Instead of using a simple rectangular box, two of the horizontal edges of the mechanical body of a common periscope are replaced with two pairs of parallel reflecting surfaces, 28*a*, 28*b* and 30*a*, 30*b*, respectively. The reflecting surfaces 28*a* and 30*a* converge with respect to each other, while the reflecting services 28*b* and 30*b* diverge with respect to each other, in the direction of the output aperture 20. The two pairs form a continuous surface, namely, the edges of the surfaces 30*a* and 28*b*, and respectively, 28*a* and 30*b* contact each other, forming two contiguous surfaces in cross-section in the configuration of a bow-tie.

As can be seen, the central part of the device is a free-space media and the rays traverse this media from the input aperture to the output aperture 20 without any reflectance.

While the central part of the FOV is projected directly through to the aperture 20 as in FIG. 2, the rays from the lower part of the FOV are reflected from surfaces 28*a* and 28*b*, while the rays from the upper part of the FOV are reflected from surfaces 30*a* and 26*b*. Since the rays that enter the EMB 8 are either traveling directly from the input aperture or reflected twice from a pair of parallel surfaces, the original direction of each ray is maintained, and the original image is not affected. As can be shown, the output image at the EMB 8 is composed of three parts: a central part of the optical waves, which is not reflected by either of the pairs of parallel reflecting surfaces, and two side parts which are reflected twice by the surfaces 28*a*, 28*b*; 30*a*, 30*b*. These three parts must be combined properly to form a smooth image to the eyes of the viewer, without any stripe or ghost images.

For simplicity, the direction of the rays is inverted from the EMB 8 to the input aperture 10. Each ray which is reflected by surfaces 28*a* and 30*b*, is also reflected by surface 28*b*, and respectively, 30*a* before it impinges on input aperture 20. To confirm this, it is sufficient to check the path of two rays: the marginal ray of the extreme angle 32 of the FOV, incident on surface 28*a* at a point 34, must impinge on surface 28*b* beyond its intersection with surface 30*a*; and the marginal ray 36, incident on surface 28*a* adjacent to its intersection 38 with surface 30*b*, must impinge on surface 28*b* before it crosses the input aperture 20. As both marginal rays meet the requirement, all rays from the FOV that are incident on surface 28*a* will necessarily also impinge on surface 28*b*. Thus, if the direction of the rays is again inverted, a ray located in the FOV that impinges on the EMB at an angle located in the FOV necessarily enters the input aperture at the same angle. The present example provides for an FOV of 42° with a significantly reduced input aperture 20 of 180 mm. Naturally, in cases where l is extremely large, a cascade of two or more pairs of reflecting surfaces can be used to achieve the desired FOV while maintaining an acceptable size of an input aperture.

The two pairs of parallel reflecting surfaces that are illustrated in FIG. 4 are identical and symmetrical about the optical axis of the device, however, the two pairs of parallel reflecting surfaces, need not necessarily be identical to each other and an asymmetrical system with different pairs can be utilized according to desired upper and lower angles of the FOV. Moreover, for systems where only one of the FOVs is to be increased (either the upper or the lower), only one pair of parallel reflecting surfaces is required to obtain a desired FOV. In addition, not only the vertical FOV can be increased by this method. There are systems, especially for navigating and/or driving, wherein the horizontal FOV is more important, and thus, it can be increased. Furthermore, the FOV can be increased in both the horizontal and the vertical axes, however, special care must be taken to prevent cross-talk between the horizontal and the vertical pairs.

The purpose of the optical device according to the present invention is to transfer light within a given field-of-view (FOV) of angles, between a minimal angle $\alpha_{min}$ and a maximal angle $\alpha_{max}$. The optical device comprises an input aperture, an output aperture remotely located from said input aperture, such that a light wave, located within the said FOV, that enters the optical device through the input aperture, that is, having an incident angle α such that $\alpha_{min}<\alpha<\alpha_{max}$, exits said optical device through the output aperture, and having at least one pair of parallel reflecting surfaces. Part of the light waves located within the FOV that enters the input aperture, passes directly in free space to the output aperture without being reflected, while another part of the light waves entering the input aperture within the FOV, arrives at the output aperture after being twice reflected by the pair of parallel reflecting surfaces.

The reflecting surfaces 28*a*, 28*b*, 30*a*, 30*b*, which are illustrated in FIG. 4, are simple mirrors that obey the first Snell law, that is, that the incident angle is equal to the reflected angle at the surface. There are cases, however, where it is preferred to use two parallel diffraction gratings instead, wherein the reflected angle at the surface is not equal to the incident angle. It is true that, for a given incident angle the reflected angle depends on the wavelength of the incident ray. If the grating functions of the two gratings are identical, however, then the reflected angle at the second reflecting surface will be equal to the incident angle at the first reflecting surface for all wavelengths.

The embodiment of FIG. 4 is an example illustrating a simple implementation of this method. The use of pairs of parallel reflecting surfaces in order to decrease the aperture of the device for a given FOV, or alternatively, to increase the useable FOV for a given aperture, is not limited to periscopes and it can be utilized in other optical devices where the input aperture is located far from the output aperture, including, but not limited to, free-space systems such as HUDS, HMDs, and the like.

Figure 5:
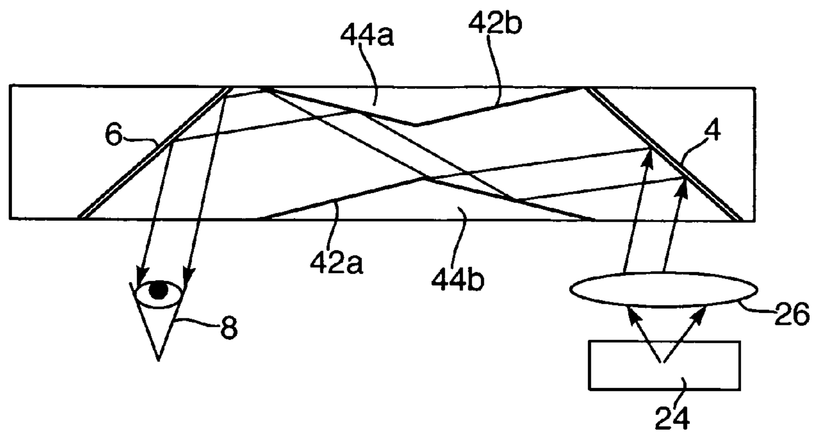

As illustrated in FIG. 5, the FOV of the optical system can be increased by using the same structure as described with reference to FIG. 3 by adding to it two pairs of parallel mirrors 42*a*, 44*b*, 44*a* and 42*b*, as shown in FIG. 4.

Figure 6A:
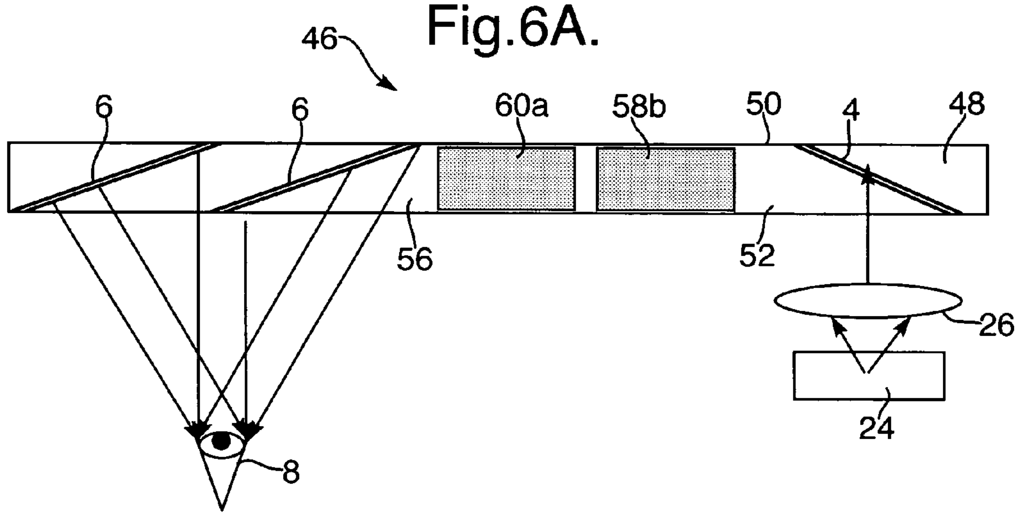
Figure 6B:
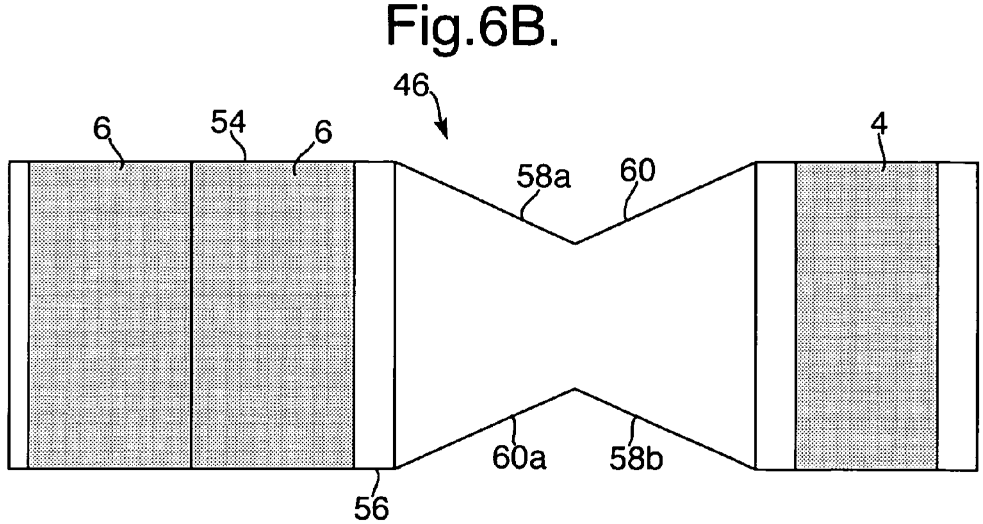

FIGS. 6A and 6B illustrate a side view and a top view of a substrate-mode optical device 46 of the present invention, comprising a light-transmitting substrate 48 having at least two major parallel surfaces 50, 52, and lateral edges 54, 56, an optical element 4 for coupling the light from the display source 24 via a collimating lens 26 into the substrate 48 by total internal reflection, and one or more at least partially reflecting optical elements 6 located in the substrate, for coupling the light into the EMB 8 of a viewer. Instead of using a simple rectangular substrate plate, however, part of the two lateral edges 54, 56 of the substrate 48 are provided with two pairs of parallel reflecting surfaces 58*a*, 58*b*, 60*a*, 60*b*, similar to the two pairs of parallel mirrors 28*a*, 28*b* and 30*a*, 30*b* of FIG. 4. Typically, the angles between the rays trapped inside the substrate 48 and the reflecting surfaces

58*a*, 58*b*, 60*a*, 60*b* are sufficiently large so as to affect total internal reflection. As such, no special reflecting coating is required for these surfaces and they are merely polished surfaces. The combination of the present invention with a substrate-mode configuration yields a compact and convenient optical system having a satisfactory optical performance with a wide FOV.

The embodiment in FIGS. 6A and 6B is an example of a method for coupling the input waves into the substrate. Input waves could, however, also be coupled into the substrate by other optical means, including, but not limited to, folding prisms, fiber optic bundles, diffracting gratings, and others.

Furthermore, while in the embodiment of FIGS. 6A and 6B, the input waves and the image waves are located on the same side of the substrate, other configurations are envisioned, in which the input and the image waves are located on opposite sides of the substrate. There may even be applications in which the input waves can be coupled into the substrate through one of the substrate's lateral edges.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical device for transferring light within a given field-of-view, comprising:

an input aperture;

reflecting surfaces, and an output aperture located in spaced-apart relationship from said input aperture such that light waves, located within the said field-of-view, that enter the optical device through said input aperture, exit the optical device through said output aperture, and characterized in that said reflecting surfaces are at least one pair of parallel reflecting surfaces and that part of said light waves located within said field-of-view that enter the input aperture, pass directly in free space to the output aperture without being reflected, while another part of the light waves within said field-of-view that enters the input aperture, arrives at the output aperture after being twice reflected by said at least one pair of parallel reflecting surfaces.

2. The optical device according to claim 1, wherein another part of the light waves arrives at said output aperture at the same direction that it arrives at said input aperture.

3. The optical device according to claim 1, wherein said at least one pair of reflecting surfaces changes the direction of propagation of at least part of said light waves and then reflects it back to its original direction.

4. The optical device according to claim 1, wherein the location and orientation of said at least one pair of reflecting surfaces and of said output aperture produce the field of view for a given input aperture.

5. The optical device according to claim 1, wherein the location and orientation of said at least one pair of reflecting surfaces and of said output aperture produce said input aperture for a given field of view.

6. The optical device according to claim 1, wherein said at least one pair of reflecting surfaces reflects said light waves into a direction calculated to reach one eye of an observer.

7. The optical device according to claim 1, wherein said at least one pair of reflecting surfaces reflects said light waves into a direction calculated to reach both eyes of an observer.

8. The optical device according to claim 1, comprising at least two pairs of parallel reflecting surfaces.

9. The optical device according to claim 8, wherein said two pairs of reflecting surfaces are identical to each other.

10. The optical device according to claim 1, wherein said at least one pair of reflecting surfaces are symmetrical around the optical axis of the device.

11. The optical device according to claim 8, wherein a first reflecting surface of each pair converges with respect to each other and a second reflecting surface of each pair diverges with respect to each other in the direction of the output aperture.

12. The optical device according to claim 11, wherein the two pairs of reflecting surfaces contact each other to form two contiguous surfaces.

13. The optical device according to claim 1, wherein said reflecting surfaces are mirrors.

14. The optical device according to claim 1, wherein said reflecting surfaces are coatless.

15. The optical device according to claim 1, wherein said two reflecting surfaces are diffractive gratings.

16. The optical device according to claim 15, wherein the grating functions of said diffractive gratings are identical to each other.

* * * * *